United States Patent
Motte

(10) Patent No.: US 7,193,201 B2
(45) Date of Patent: Mar. 20, 2007

(54) METHOD FOR MEASURING EXTERNAL LIGHT TO CONTROL PROTECTION MEANS AGAINST SUNLIGHT OR ILLUMINATION

(75) Inventor: Emeric Motte, Sallanches (FR)

(73) Assignee: Somfy SAS, Cluses (FR)

( * ) Notice: Subject to any disclaimer, the term of this patent is extended or adjusted under 35 U.S.C. 154(b) by 154 days.

(21) Appl. No.: 10/484,184

(22) PCT Filed: Jul. 3, 2002

(86) PCT No.: PCT/IB02/02619

§ 371 (c)(1),
(2), (4) Date: Jan. 16, 2004

(87) PCT Pub. No.: WO03/008753

PCT Pub. Date: Jan. 30, 2003

(65) Prior Publication Data

US 2004/0164231 A1   Aug. 26, 2004

(30) Foreign Application Priority Data

Jul. 18, 2001  (FR) .................................. 01 09616

(51) Int. Cl.
G01J 1/44  (2006.01)
H01J 40/14  (2006.01)
H03F 3/08  (2006.01)
H05B 37/02  (2006.01)
H05B 39/04  (2006.01)

(52) U.S. Cl. .................. 250/214 R; 250/214 AL; 318/480; 160/5

(58) Field of Classification Search ......... 250/214 AL, 250/214 B, 214 C, 203.4, 214 R, 203.3; 702/2, 3, 57, 189; 340/480, 600; 160/5; 318/480; 126/573–608; 136/246; 359/853; 353/3

See application file for complete search history.

(56) References Cited

U.S. PATENT DOCUMENTS 4,355,896 A * 10/1982 Frosch et al. ............... 356/222
5,648,656 A *  7/1997 Begemann et al. ... 250/214 AL

FOREIGN PATENT DOCUMENTS

DE   19709546 A1   9/1998
DE   19715517 A    11/1998
DE   19715517 A1   11/1998

* cited by examiner

Primary Examiner—Stephone B. Allen
Assistant Examiner—Suezu Ellis
(74) Attorney, Agent, or Firm—Frommer Lawrence & Haug LLP; Ronald R. Santucci

(57) ABSTRACT

The invention concerns a method which consists in detecting and discriminating at least three states, respectively blue sky, white sky and direct sunlight. The discrimination between the three states is based, for example, on an intermediate detection distinguishing between either a homogenous state or a nonhomogeneous state of the sky. White sky means a sky saturated with humidity, with strong light diffusion and producing a high level of brightness. The method can be implemented, for example by using sensors or a monochromatic or color camera.

15 Claims, 2 Drawing Sheets

Figure 1:
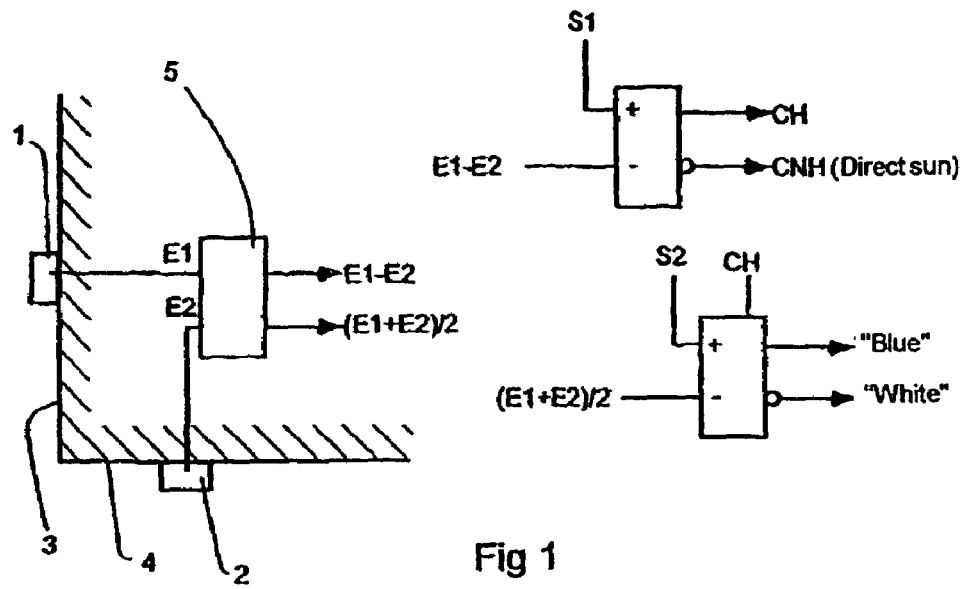

METHOD FOR MEASURING EXTERNAL LIGHT TO CONTROL PROTECTION MEANS AGAINST SUNLIGHT OR ILLUMINATION

The invention relates to a process for measuring exterior light for the control of a motorized means of solar protection fitted to at least one bay of a building and/or lighting.

It is known to use the signal transmitted by an exterior sunshine sensor to actuate solar protection means situated on a bay or a set of bays.

Such solar installations are described, for example, in patents FR 2 510 777, FR 2 740 825 and DE 43 15 406. In these installations the motorized solar protection elements are controlled as a function of measurements performed by one or more solar cells, that is to say photovoltaic cells, in general one cell per facade. These solar cells measure the luminous intensity of the direct solar radiation. Above a certain threshold, and after a certain time delay (described in particular in document DE 43 15 406), the solar protections are placed in a certain position. Below this threshold, and after a certain time delay, they are raised again.

Numerous improvements have been made to these installations, such as variable time delays, different thresholds of appearance and of disappearance, tracking of the course of the sun as a function of longitude, latitude, date, time, orientation of the facade, mechanical and dimensional characteristics of the bay to be protected. All the automation mechanisms of the prior art have a common point, however, they all function in periods of sunshine and are controlled by direct solar radiation.

U.S. Pat. No. 4,538,218 describes a sensor making it possible to circumvent the influence of direct sun on the measurement of the exterior illumination. The intended aim is to ascertain the level of light at least available by scattering from the heavens, this level conditioning the supplementary provision of light to be provided by lighting units and consequently the power to be delivered to these lighting units. For this purpose, the use is advocated of a plurality of exterior sensors disposed at offset angles and covering the entire portion of the heavens seen from the facade. The lowest value of the signals sensed is necessarily representative of the minimum available natural illumination. Conversely, the highest value corresponds to the effect of direct sun. This value is eliminated and the other signals are averaged, if appropriate, to evaluate the average available scattered illumination.

In U.S. Pat. No. 5,237,169 in the name of the applicant, it is proposed that solar protections and artificial lighting be controlled simultaneously with a view to optimizing these two components of visual comfort.

U.S. Pat. No. 4,355,896 provides for the use of several light sensors, of which one receives the direct light from the sun and the others are directed towards parts of the sky not containing the sun, with a view to determining the degree of cloudiness. This device is intended for meteorological predictions, for the evaluation of climatic factors and for the evaluation of solar energy converters and for other unspecified applications.

U.S. Pat. No. 4,008,391 describes a device for measuring the quality of the lighting of a work surface. This device uses two linear sensors. By arithmetic summation and division of the signals delivered by the sensors a resultant is determined that can be read out on display means.

It is also well known to perform an accurate measurement of radiation scattered by means of a device known as a pyranometer. Let us recall that this device simply contains a single horizontal photovoltaic sensor and an opaque arc of a circle centered on this sensor and inclined along the latitude of the location. Such a device would be relatively complicated to use for the control of solar protection.

In a general manner, the prior art is devoid of any document in which there is a concern to introduce a discrimination between fundamentally different situations of scattered light, that is to say in the absence of direct sun: that of a cloudless sky or, conversely, that of a very cloudy sky or one saturated with humidity. The latter situation, often dubbed "white sky" is frequently encountered in the equatorial zones, but also in the countries of northern Europe. The sun illuminates the cloudy zone which produces great scatter and therefore presents considerable luminance, such that solar protections are required. This situation is also akin to that of a building's large bright facade opposite the relevant bay and itself subjected to the direct illumination of the sun. A highly reflective, small neighboring facade of small solid angle seen from the relevant bay, will conversely be akin to direct sun.

The aim of the present invention is to fill the lacuna alluded to above.

The process for measuring exterior light according to the invention is one wherein at least three states, respectively blue sky, white sky and direct sun, are detected and discriminated. Here the term blue sky refers to a substantially homogeneous sky presenting low luminance (fair weather sky, gray sky, night sky) and the term white sky refers to a substantially homogeneous sky presenting high luminance.

Each state may be decomposed into several substates. The discrimination between the three states is obtained on the basis of an intermediate detection distinguishing either a homogeneous state CH or a nonhomogeneous state CNH of the sky.

According to one mode of execution, the difference between the measurements E1, E2 of two sensors, or of a plurality of sunlight sensors that may not simultaneously receive direct sunlight, is compared with a first threshold value S1, the state of the sky being homogeneous CH if the absolute value of this difference remains less than the threshold S1 and nonhomogeneous CNH in the converse case. In a homogeneous sky CH, the measurement E1, E2 of one sunlight sensor at least, or the average of several sunlight sensors, is compared with a second threshold value S2, the state of the sky being white if the measurement is greater than the threshold S2 and blue in the converse case.

The direct sun state corresponds to a nonhomgeneous state of the sky.

According to another mode of execution, in a nonhomogeneous sky state CNH, the measurement E1, E2 of one sunlight sensor at least, or the average of several sunlight sensors is compared with a third threshold value S3, the state of the sky being annoying direct sun if the measurement is greater than the threshold S3, and non-annoying direct sun in the converse case.

According to another mode of execution, the plurality of sensors is replaced by a monochrome camera with matrix sensors that is provided with a wide-angle objective, and whose video signal is utilized, over at least one scanning period, to define the homogeneous or nonhomogeneous state of the sky by comparing the measured differences with a first threshold S1, then in the case of a homogeneous sky to define a blue sky state if the average measurement is less than a second threshold S2 and white sky state in the converse case, and finally, to define a state of annoying direct sun by comparing the measurements with a third threshold S3.

According to another mode of execution, the plurality of sensors is replaced by a color camera with matrix sensors R, G, B that is provided with a wide-angle objective, and whose video signal of one color, for example G, is utilized, over at least one scanning period, to define the homogeneous or nonhomogeneous state of the sky by comparing the measured differences with a first threshold S1, then, in the case of a homogeneous sky, by using the ratio of the colors R/B or their difference to define the color of the sky.

According to another mode of execution using a processor using fuzzy logic algorithms, each of the detected and discriminated states is in this case a state characterized by its membership function in a fuzzy subset.

Two intermediate fuzzy subsets, respectively homogeneous sky and nonhomogeneous sky, and the corresponding membership functions CH and CNH are preferably defined.

According to one mode of execution, the variable magnitude of the homogeneous sky CH and nonhomogeneous sky CNH membership functions is the absolute difference between the measurements E1, E2 of two sensors or the maximum difference of a plurality of sunlight sensors that may not simultaneously receive direct sunlight.

According to another mode of execution, the variable magnitude of the blue sky and white sky membership functions is the measurement E1, E2 of one sunlight sensor at least, or the average of several sunlight sensors The sensors used are constituted, for example, by the matrix of photosensitive elements of a monochrome or color CCD camera, furnished with a wide-angle objective.

The subject of the invention is also a solar protection and/or lighting device comprising at least one element operated by the process according to one of the modes of execution.

The appended drawing represents, by way of example, a few modes of implementation of the process according to the invention.

FIG. 1 diagrammatically represents a first mode of execution.

Figure 2:
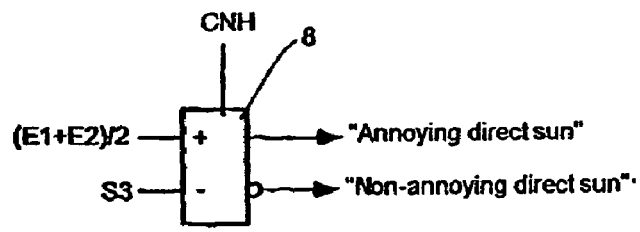

FIG. 2 diagrammatically represents a variant of the first mode of execution.

Figure 3:
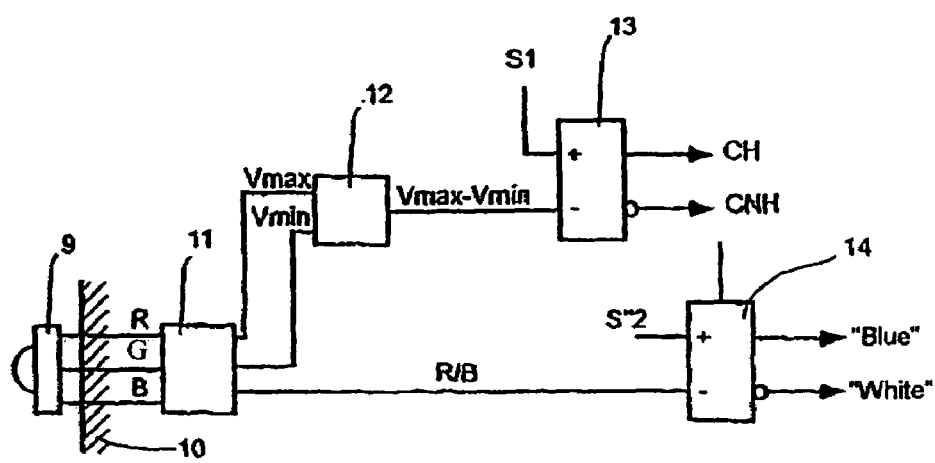

FIG. 3 diagrammatically represents a second mode of execution.

Figure 4:
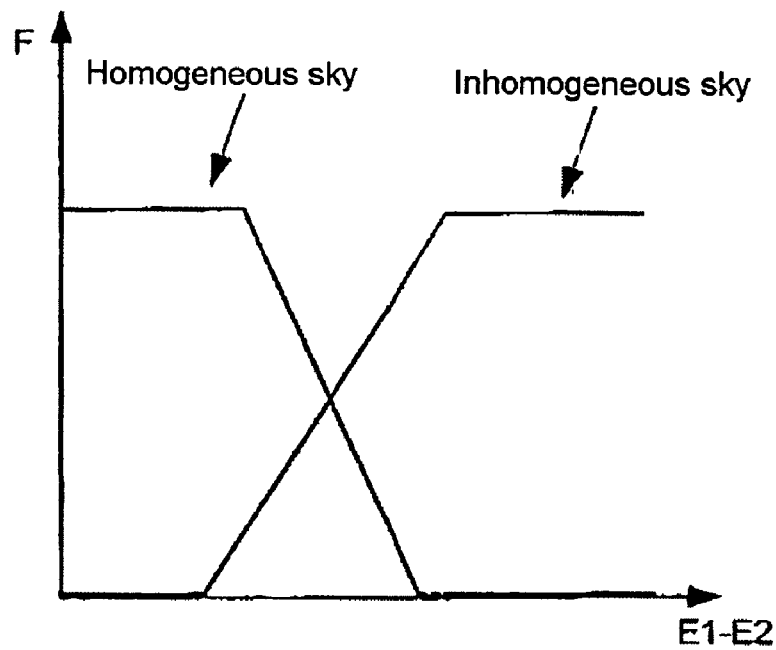
Figure 5:
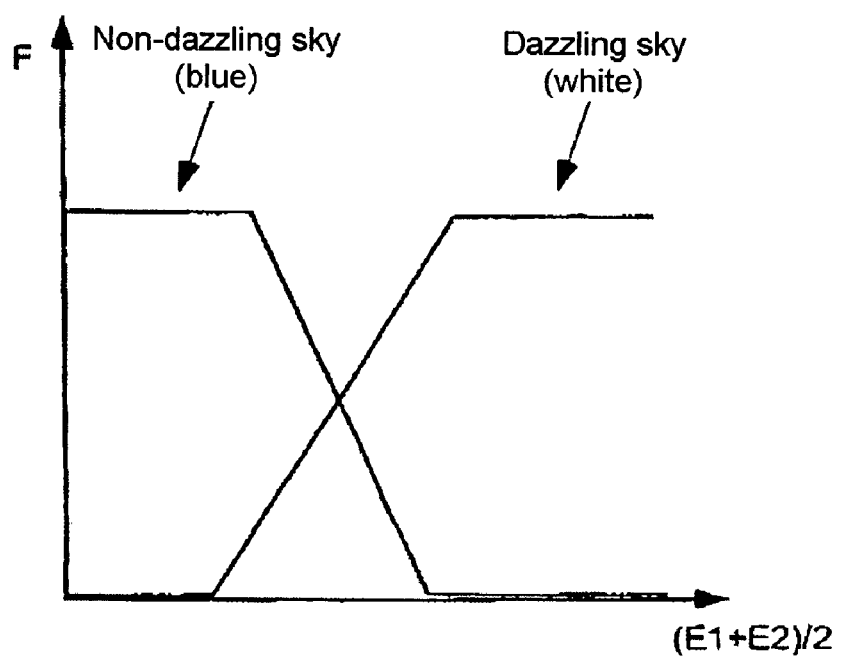

FIGS. 4 and 5 are charts illustrating, in a conventional manner, the application of the method of fuzzy logic to the processing of three states.

In the mode of execution according to FIG. 1, use is made of two photovoltaic sensors 1 and 2 disposed respectively on two nonparallel facades 3 and 4 of a building. These sensors could also be close to one another but disposed in such a way as to form a sufficient angle, typically equal to half the angular opening of the space to be scanned. The sensors currently on the market being intentionally highly non-directional, two sensors are sufficient to cover the heavens. The signals provided by the sensors 1 and 2 are applied to a straightforward computation unit 5 which delivers on its outputs on the one hand the absolute value |E1−E2| and on the other hand the average (E1+E2)/2. By means of a first comparator 6 the absolute value |E1−E2| is compared with a first threshold value S1, while the average value (E1+E2)/2 is compared, by means of a second comparator 7, with a second threshold value S2. S1 is used as threshold for detecting the homogeneity of the luminances of the heavens whereas the threshold S2 is a value corresponding to dazzle. S1 is much smaller than S2. It will be recalled that the comparator 7 is of the type exhibiting two analog inputs A and B, an enable input V (CH) and two outputs, of which one is active if A>B and the other is active if A<B, the outputs being active only if the enable input is activated.

If |E1−E2|<S1, the sky is said to be homogeneous (output CH): none of the sensors is receiving direct sun. If on the other hand |E1−E2|>S1, this signifies that one of the sensors is receiving the sun directly (nonhomogeneous sky, output CNH).

Comparing the average (E1+E2)/2 with S2 makes it possible to ascertain, when the sky is homogeneous (CH), whether the sky is dazzling ("white") or otherwise ("blue"). Instead of comparing the average, it would be possible to simply compare E1 or E2 with S2.

It would of course be possible to compare the sum E1+E2 with a threshold S'2 twice as large as S2.

If the sensors are used to control straightforward installations, in which the solar protections are either fully closed or fully open, use will preferably be made of a third threshold S3, generally greater than the threshold S2. The "direct sun" state is then decomposed into two substates, "annoying direct sun" and "non-annoying direct sun". This mode of execution is represented diagrammatically in FIG. 2. Here the average (E1+E2)/2 is compared with S3 by means of a comparator 8 on the outputs of which are obtained the two substates "annoying direct sun" and "non-annoying direct sun".

The sensor described in U.S. Pat. No. 4,538,218 may for example be used as sensor. The discriminator must then be modified so as to compare the "direct sunlight" level with S3 and to compare the "skylight" level with S2.

Of course, the above two sensors may be replaced by a larger number of sensors, thereby allowing a wider field and/or better information regarding the heterogeneous nature of the sky.

In this case, a simple way of using the above method consists in considering the maximum difference (in absolute value) for the homogeneity test (comparison with the threshold S1) and the average value of the measurements for the blue sky/white sky discrimination (comparison with the threshold S2) or else for an annoying direct sun/non-annoying direct sun discrimination (comparison with the threshold S3).

According to another mode of execution, this plurality of sensors is constituted by the matrix of photosensitive elements of a "scan type" CCD camera, furnished with a wide-angle objective. In the case of a monochrome camera, the utilization of the video signal over a period gives the distribution of the light received on the various pixels. It is known to the person skilled in the art to obtain, from this signal, the average value and the maximum difference, so as to apply the processing described above. Although the invention does not require a fine analysis of the sky, such a solution is beneficial since such cameras are nowadays accessible at very low price and can be interfaced in a straightforward manner with a digital system. These cameras are known as "webcams".

FIG. 3 diagrammatically represents the use of a color camera. The camera 9 is placed outside the building 10. It delivers three video signals R (red), G (green), B (blue). During each complete scanning cycle of the matrix of the sensors, each video signal varies as the light sensed by all the pixels scanned in succession. The R, G, B video signals are processed by a unit 11. One of the video signals, for example G, is processed in a digital manner or with the aid of straightforward analogue means (diodes, resistors and capacitors) in such a way as to give rise to two values VMAX and VMIN. On a third output, the unit 11 provides the ratio of the other two video signals, in this instance R/B.

The circuit 12 computes the absolute value of the difference VMAX−VMIN, that is to say |VMAX1−VMIN|, and this value is compared with the threshold S1 by means of a comparator 13. As in the first mode of execution, if |VMAX1−VMIN|<S1, the heavens are considered to be homogenous (blue sky or white sky, output CH). If it is greater than S1, this signifies direct sun (nonhomogeneous sky, output CNH).

In the case of a homogeneous sky (CH), it remains to distinguish between blue sky and white sky. For this purpose use is made of the spectral decomposition afforded us by the camera. More precisely, the ratio R/B is compared with a threshold value S"2 by means of a comparator 14. The value of S"2 is much smaller than 1. If R/B<S"2, this signifies that the signal B is much larger than the signal R, that is to say that the sky is "blue". If R/B>S"2, this signifies that the sky is "white".

It is of course possible to choose one of the other two video signals R and B to output the values MAX and MIN and to calculate the ratio of the other two signals.

Instead of the value MIN it would be possible to use the average value.

A person skilled in the art will be able to use a combination other than the ratio to compare the relative magnitude of the various spectral components of the light.

Instead of a color camera, it is possible to use photodiodes furnished with filters as is described in U.S. Pat. No. 5,426,294 to analyze the spectral composition of the light captured.

According to another mode of execution, fuzzy logic algorithms are used. It is known for automation engineers to use fuzzy logic algorithms to adapt the response to a situation combining several aspects. Each individual case calls for a particular response referred to as a "rule", but it is acceptable for a situation to require the weighted combination of several rules. Thus, in the case of the invention, a sky veiled by a homogeneous humid atmosphere may give rise to a combination of aspects such as white sky and direct sun (attenuated).

The three-state discrimination according to the invention is applied by considering that each of the three detected and discriminated states is characterized by its membership function in a fuzzy subset (direct sun or blue sky or white sky). Unlike in the previous cases the states are no longer exclusive.

In a straightforward manner and according to the same principles as in the above modes of execution, it is beneficial to decompose the discrimination into two stages by designating an intermediate membership function: homogenous sky.

FIG. 4 gives, in a conventional manner, an example of the homogeneous sky and nonhomogeneous sky membership functions. As in the above modes of execution, it is the absolute value of the difference in illumination between two sensors or a plurality of elementary sensors (CCD camera) which makes it possible to determine the degree of membership in one or other of the fuzzy subsets, homogeneous sky and nonhomogeneous sky. In a straightforward case a nonhomogeneous sky may be likened to direct sun.

FIG. 5 represents in the same manner an example of the blue sky and white sky membership functions. The degree of membership in one or other of the fuzzy subsets depends either on the value of average level of illumination or on its spectral composition, for example R/B, according to the sensor used.

In the applications to the control of solar protection means, the detecting of two different states does not necessarily involve two different processing operations. Thus, in the case of a straightforward installation, without automatic lighting and with automated solar protection with no intermediate position (0 or 100% protection), the solar protection will be deactivated in state 1 (blue sky) and activated for states 2 and 3 (direct sun or white sky).

In the case of a more elaborate solar protection installation comprising, for example, a perforated screen reducing the transparency of the bay and an opaque screen able to stop direct sun, the solar protection will be deactivated for state 1, the opaque screen will be activated for state 2 and the perforated screen will be activated for state 3.

If the installation so permits, the opaque screen will be lowered only down to a level sufficient so as not to be an annoyance to the occupants of the building, for example to the user's liking or as a function of the latitude, the time and the calendar. In this case, state 2 is decomposed into a plurality or a continuity of substates.

A decomposition of state 2 is especially useful for controlling the orientation of the slats of a slatted blind.

In the same manner, it is possible if need be, as described in the prior art, to control the lighting units to a greater or lesser extent when state 1 prevails, by decomposing it into a plurality or a continuity of substates.

A decomposition of state 3 (white sky), may also be used to modify the transparency of an electro-chromic glazing as a function of the greater or lesser luminance of the sky.

The invention claimed is:

1. A control process for measuring exterior light and controlling at least one motorized means of a solar protection and/or lighting means, said control process comprising the steps of:
    detecting at least three states, respectively blue sky, white sky and direct sun;
    wherein a blue sky is a substantially homogeneous sky presenting low luminance and a white sky is a substantially homogeneous sky presenting high luminance;
    discriminating at least said three states, and
    activating said motorized means of said solar protection and/or lighting means according to the discriminated states.

2. The process as claimed in claim 1, wherein the discrimination between the three states is based on an intermediate detection distinguishing between a homogeneous state and a nonhomogeneous state of the sky.

3. The process as claimed in claim 2, wherein measurements are derived from a plurality of sunlight sensors which may not simultaneously receive direct sunlight,
    wherein an absolute value of a measured difference between the measurements of the plurality of sunlight sensors is compared with a first threshold value, and
    wherein the state of the sky is determined to be homogeneous if the absolute value of the measured difference is less than the first threshold value and nonhomogeneous if otherwise.

4. The process as claimed in claim 3, wherein, in a homogeneous sky, a measurement based on an output of at least one of:
    a single sunlight sensor and an average measurement of the plurality of sunlight sensors is compared with a second threshold value,
    the state of the sky being determined to be white if the measurement is greater than the second threshold and blue if otherwise.

5. The process as claimed in claim 4, wherein, in a nonhomogeneous sky, a measurement based on an output of at least one of:

a single sunlight sensor output and an average measurement of the plurality of sunlight sensors is compared with a third threshold value, the state of the sky being determined to be annoying direct sun if the measurement is greater than the third threshold, and non-annoying direct sun if otherwise.

6. The process as claimed in claim 5, wherein the plurality of sensors is established by a color camera with R, G, B matrix sensors and that is provided with a wide-angle objective, and a video signal of one of the colors is utilized, over at least one scanning period, to define the homogeneous or nonhomogeneous state of the sky by comparing the absolute value of the measured difference between the measurements of the plurality of sunlight sensors with the first threshold, and in the case of a homogeneous sky, to define a blue sky state if a ratio of video signals of the other two colors is less than a fourth threshold and white sky state if otherwise.

7. The process as claimed in claim 3, wherein the plurality of sunlight sensors is established by a monochrome camera with matrix sensors that is provided with a wide-angle objective, and whose video signal is utilized, over at least one scanning period, to define the homogeneous or nonhomogeneous state of the sky by comparing the absolute value of the measured difference between the measurements of the plurality of sunlight sensors with the first threshold, and in the case of a homogeneous sky to define a blue sky state if an average measurement of the plurality of sunlight sensors is less than a second threshold and white sky state if otherwise, and to define a state of annoying direct sun by comparing the average measurements with a third threshold.

8. The process as claimed in claim 3, wherein a processor using fuzzy logic algorithms is used and wherein each of the detected and discriminated states is a state characterized by its membership function in a fuzzy subset.

9. The process as claimed in claim 8, wherein two intermediate fuzzy subsets, respectively homogeneous sky and nonhomogeneous sky, and the corresponding membership functions are defined.

10. The process as claimed in claim 9, wherein a variable magnitude of the homogeneous sky and nonhomogeneous sky membership functions is at least one of: an absolute difference between the measurements of the plurality of sunlight sensors and a maximum difference between the measurements of the plurality of sunlight sensors that may not simultaneously receive direct sunlight.

11. The process as claimed in claim 10, wherein the sensors are established by a matrix of photosensitive elements of a monochrome or color CCD camera, furnished with a wide-angle objective.

12. The process as claimed in claim 9, wherein a variable magnitude of the blue sky and white sky membership functions is a measurement of at least one sunlight sensor or an average of several sunlight sensors.

13. The process as claimed in claim 12, wherein the sensors are established by a matrix of photosensitive elements of a monochrome or color CCD camera, furnished with a wide-angle objective.

14. The process as claimed in claim 1, wherein at least one state is decomposed into plural substates.

15. A system, comprising:

at least two sunlight sensors facing different directions from each other;

a computation device receiving signals from the sensors and generating corresponding outputs to the sensors; and at least one comparator receiving the outputs and at least partially based thereon, outputting a signal representative of whether the sky is homogenous or nonhomogeneous, detecting at least three states, respectively blue sky, white sky and direct sun;

wherein a blue sky is a substantially homogeneous sky presenting low luminance and a white sky is a substantially homogeneous sky presenting high luminance and discriminating at least said three states, and activating a motorized means of a solar protection and/or lighting means according to the discriminated states.

* * * * *